United States Patent
Li et al.

(10) Patent No.: US 8,405,930 B1
(45) Date of Patent: Mar. 26, 2013

(54) METHOD AND SYSTEM FOR PROVIDING A TRANSDUCER HAVING DUAL, ABS RECESSED AUXILIARY POLES ON OPPOSITE SIDES OF A MAIN POLE WITH NON-MAGNETIC SPACER ADJOINING BACK PORTION OF MAIN POLE AND POSITIONED BETWEEN AUXILIARY POLES

(75) Inventors: Zhanjie Li, Pleasanton, CA (US); Zhigang Bai, Milpitas, CA (US); Feng Liu, San Ramon, CA (US); Yugang Wang, Milpitas, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 126 days.

(21) Appl. No.: 13/070,279

(22) Filed: Mar. 23, 2011

(51) Int. Cl.
*G11B 5/147* (2006.01)
(52) U.S. Cl. ......... 360/125.08; 360/125.11; 360/125.12; 360/125.29; 29/603.14
(58) Field of Classification Search .................. 360/125.01–125.75; 29/603.01, 29/603.07, 603.14
See application file for complete search history.

(56) References Cited

U.S. PATENT DOCUMENTS

| | | | |
|---|---|---|---|
| 6,624,971 B1 | 9/2003 | Sasaki | |
| 6,712,984 B2 | 3/2004 | Sasaki | |
| 7,061,719 B2 | 6/2006 | Matono et al. | |
| 7,070,716 B2 | 7/2006 | Lam | |
| 7,113,366 B1 | 9/2006 | Wang et al. | |
| 7,116,517 B1 | 10/2006 | He et al. | |
| 7,268,973 B2 | 9/2007 | Lille et al. | |
| 7,336,441 B2 | 2/2008 | Takano | |
| 7,382,574 B2 | 6/2008 | Li et al. | |
| 7,477,483 B2 | 1/2009 | Kamada | |
| 8,077,434 B1 * | 12/2011 | Shen et al. | 360/125.12 |
| 8,179,636 B1 * | 5/2012 | Bai et al. | 360/125.17 |
| 2003/0021063 A1 | 1/2003 | Kuroda et al. | |
| 2003/0076627 A1 | 4/2003 | Minor et al. | |
| 2003/0197976 A1 | 10/2003 | Van der Heijden et al. | |
| 2004/0061973 A1 | 4/2004 | Crue et al. | |
| 2006/0119981 A1 | 6/2006 | Li et al. | |
| 2006/0262453 A1 | 11/2006 | Mochizuki et al. | |
| 2007/0211382 A1 | 9/2007 | Mochizuki et al. | |
| 2008/0174911 A1 | 7/2008 | Toma et al. | |
| 2008/0239569 A1 | 10/2008 | Yazawa et al. | |
| 2009/0052092 A1 | 2/2009 | Zhou et al. | |
| 2009/0273862 A1 | 11/2009 | McFadyen et al. | |
| 2010/0277832 A1 | 11/2010 | Bai et al. | |

* cited by examiner

*Primary Examiner* — Allen Heinz

(57) ABSTRACT

A method and system for providing a magnetic recording head is described. The magnetic recording head has an ABS configured to reside in proximity to a media during use. The magnetic recording head includes a main pole, first and second auxiliary poles, a backgap, a nonmagnetic spacer, and at least one coil. The main pole includes a pole tip occupying a portion of the ABS and a back edge distal from the ABS. Each auxiliary pole has a front recessed from the ABS and a back portion. A portion of the main pole distal from the ABS resides between the auxiliary poles. The auxiliary poles are magnetically coupled with the main pole. The backgap magnetically couples the back portions of the auxiliary poles. The nonmagnetic spacer adjoins the back edge of the main pole and is between the auxiliary poles. The coil(s) energize the main pole.

16 Claims, 4 Drawing Sheets

METHOD AND SYSTEM FOR PROVIDING A TRANSDUCER HAVING DUAL, ABS RECESSED AUXILIARY POLES ON OPPOSITE SIDES OF A MAIN POLE WITH NON-MAGNETIC SPACER ADJOINING BACK PORTION OF MAIN POLE AND POSITIONED BETWEEN AUXILIARY POLES

BACKGROUND

FIG. 1 depicts a portion of a magnetic recording transducer 10, such as a perpendicular magnetic recording (PMR) transducer. For clarity, FIG. 1 is not to scale. The conventional PMR transducer 10 includes a shield 12, main pole 14, auxiliary pole 16, coils 18 and return pole/back gap 20. Although depicted as above the main pole 14 (with respect to the substrate that is not shown), the auxiliary pole 16 might be below the main pole 14. In operation, a current is driven through the coil(s) 18 to energize the main pole 14. As a result, the mail pole 14 writes to the media (not shown).

Although the conventional PMR transducer 10 may function, it may be inefficient. The trend in magnetic recording is to higher areal densities and higher data rates. For example, areal densities exceeding 550 Gb/in$^2$ and data rates of over 2 Gb/s are desired. Such high data rates require the conventional PMR transducer 10 to have a reduced rise time for the field at high frequencies. However, the performance of the conventional PMR transducer 10 rolls off significantly at higher data rates. Accordingly, what is needed is a system and method for improving efficiency and performance of the PMR transducer.

BRIEF SUMMARY OF THE INVENTION

A method and system for providing a magnetic recording head is described. The magnetic recording head has an air-bearing surface (ABS) configured to reside in proximity to a media during use. The magnetic recording head includes a main pole, a first auxiliary pole, a second auxiliary pole, a backgap, a nonmagnetic spacer, and at least one coil. The main pole includes a pole tip occupying a portion of the ABS and a back edge distal from the ABS. The first auxiliary pole has a first front recessed from the ABS and a first back portion. The first auxiliary pole is magnetically coupled with the main pole. The second auxiliary pole has a second front recessed from the ABS and a second back portion. A portion of the main pole distal from the ABS resides between the first auxiliary pole and the second auxiliary pole. The second auxiliary pole is magnetically coupled with the main pole. The backgap magnetically couples the first back portion of the first auxiliary pole with the second back portion of the second auxiliary pole. The nonmagnetic spacer adjoins the back edge of the main pole and is between the first auxiliary pole and the second auxiliary pole. The coil(s) energize the main pole.

DETAILED DESCRIPTION OF THE EMBODIMENTS OF THE INVENTION

Figure 1:
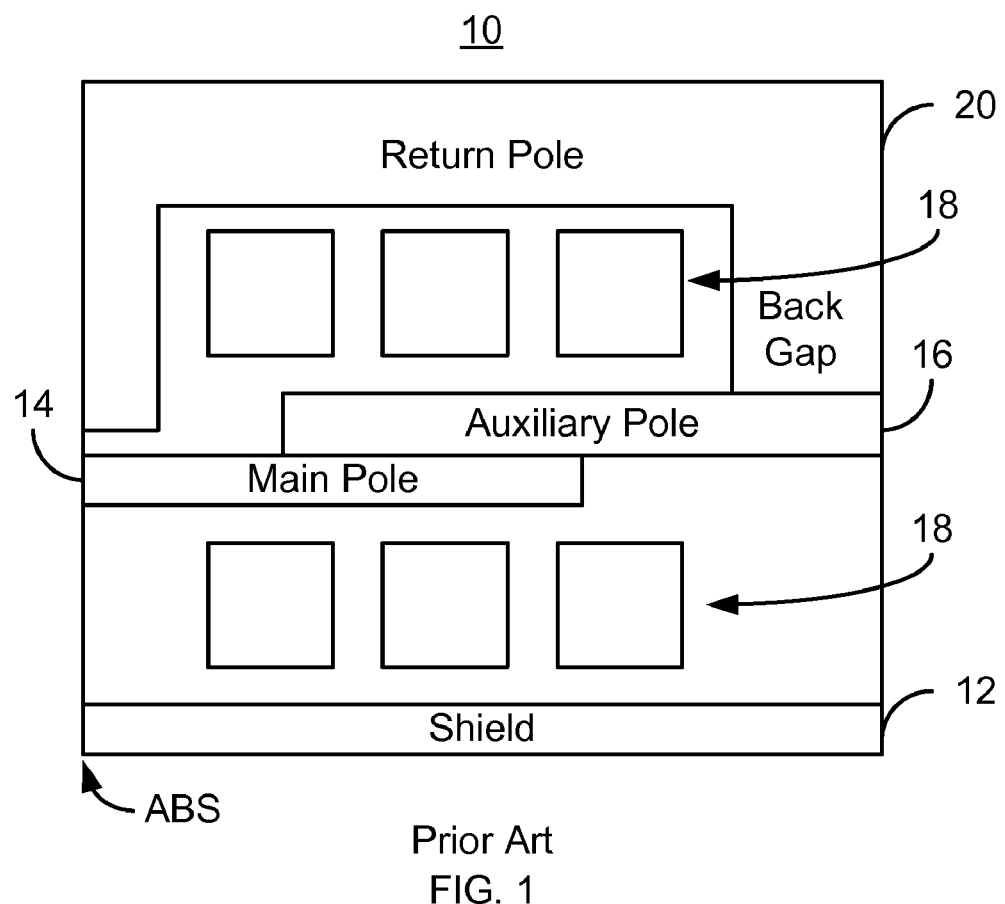
FIG. 1 is a diagram depicting a conventional PMR transducer.
Figure 2:
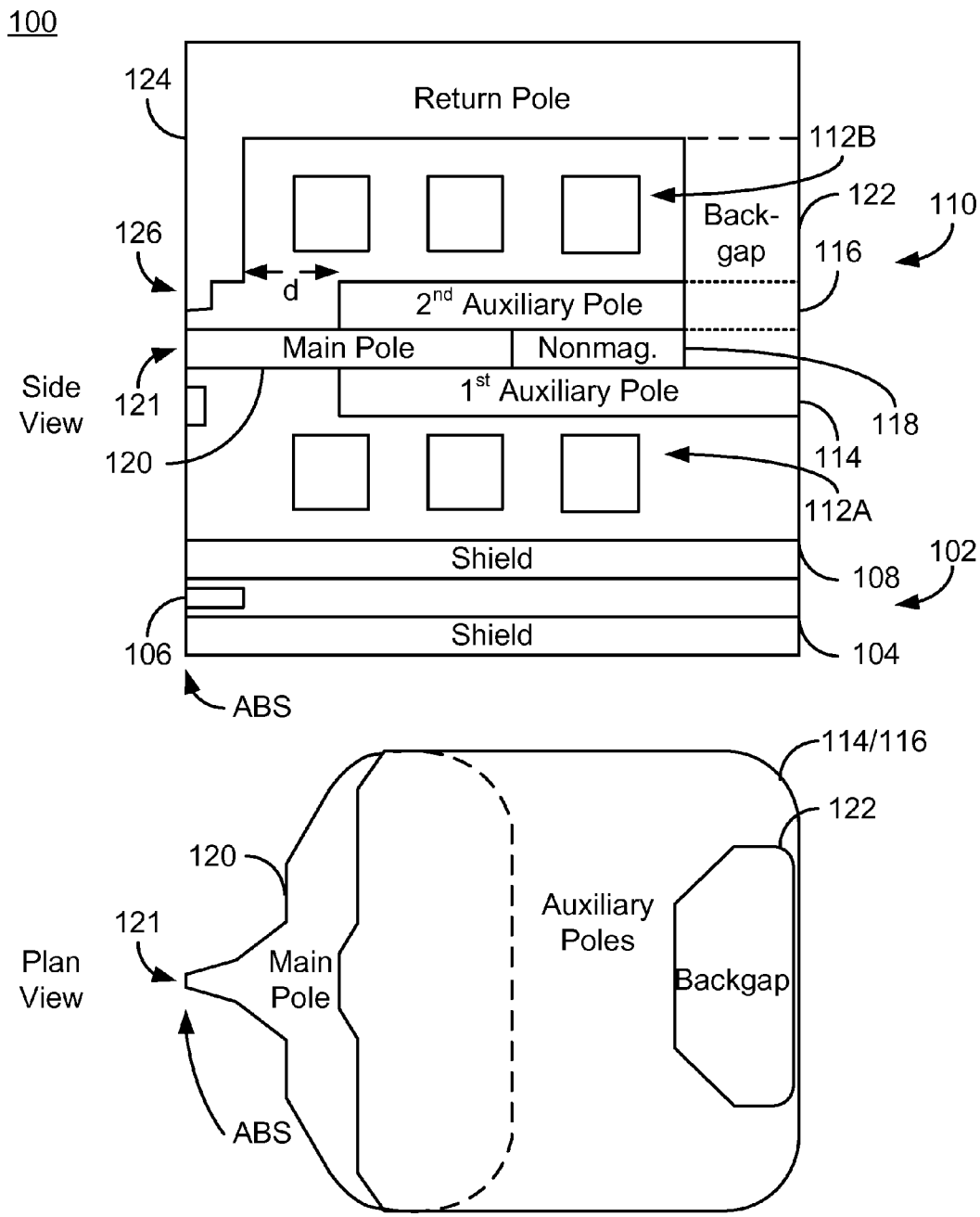
FIG. 2 is a diagram depicting an exemplary embodiment of a PMR head.

FIG. 2 is a diagram depicting side and plan views of a portion of a magnetic recording head 100 that may reside on a slider (not shown) in a disk drive that also include media (not shown). For clarity, FIG. 2 is not to scale. Further, only some of the components depicted in the side view are also shown in the plan view. In some embodiments, the magnetic recording head 100 is a PMR head. Consequently, FIG. 2 is described in the context of a PMR head. For simplicity not all portions of the PMR head 100 are shown. In addition, although the PMR head 100 is depicted in the context of particular components other and/or different components may be used. Further, the arrangement of components may vary in different embodiments. The PMR head 100 has an ABS configured to reside close to a media (not shown) during operation. The PMR head 100 is a merged head including a read transducer 102 and a write transducer (PMR transducer) 110. The read transducer 102 includes shields 104 and 108 as well as read sensor 106. In other embodiments, the PMR head 100 may include only the PMR transducer 110.

The PMR transducer 110 may be considered to include the shield 108. In addition, the PMR transducer 110 includes coil including portions 112A and 112B, auxiliary poles 114 and 116, nonmagnetic spacer 118, main pole 120, backgap 122 and return pole 124. In some embodiments, the PMR transducer 110 may have other magnetic components, such as a wraparound shield or side shields that are not shown.

The main pole has a pole tip 121 that occupies a portion of the ABS. The pole tip 121 region of the main pole 120 may have an ABS-facing surface that has a top wider than the bottom. Thus, the main pole 120 may have a reverse angle. Further, although not shown, the main pole 120 may have top and/or bottom bevels such that the main pole 120 is taller distal from the ABS. However, in other embodiments, the main pole 120 may have other shapes. The main pole 120 extends distal from the ABS. Thus, the back edge of the main pole 120 may adjoin the nonmagnetic spacer 118. Stated differently, the nonmagnetic spacer 118 separates the main pole 120 from a portion of the back gap 122. The back portion of the main pole 120 overlaps the auxiliary poles 114 and 116 and thus is shown by a dashed line in the plan view.

The backgap 122 magnetically couples the back portions of the auxiliary poles 114 and 116. The back gap also magnetically couples the auxiliary poles 114 and 116 with the return pole 124. In some embodiments, the return pole 124 and back gap 122 may be considered to act as a single entity and thus are separated by a dashed line in FIG. 2. The return pole 124 also includes a pedestal 126. In the embodiment shown, the pedestal 126 is shown as having a notch near its back surface. However, in other embodiments, the pedestal 126 may have different shapes. For example, the pedestal 126 may be free of the notch or may be sloped instead of notched. The coil(s) 112A/112B shown are helical coils. However, in other embodiments, other coils including but not limited to pancake coils may be used.

The auxiliary poles 114 and 116 are both magnetically coupled with the main pole 120 and with the back gap 122. In some embodiments, the back portion of the auxiliary pole 116 overlaps the backgap 122 and thus is shown by dashed lines in the side view. The auxiliary poles 114 and 116 are recessed from the ABS and sandwich a portion of the main pole 120 and nonmagnetic spacer 118. The auxiliary poles 114 and 116 are shown as having the same thickness, length, shape, and distance from the ABS in FIG. 2. However, in other embodiments, the auxiliary poles 114 and 116 may have different thicknesses, different lengths, different shapes, and may be different distances from the ABS. Further, the same or different material(s) may be used for the auxiliary poles 114 and 116. In some embodiments, the thicknesses of the poles 114 and 116 is at least 0.6 and not more than 1.5 µm. Further, the thickness of the auxiliary pole 114 is desired to be at least half of the thickness of the auxiliary pole 116. The saturation magnetization of the auxiliary poles 114 and 116 may also be desired to be in the same range, for example 1.8-2.3 T. However, in some embodiments, the saturation magnetization of the auxiliary pole 114 is at least 1.0 T and does not exceed 2.3 T, while the saturation magnetization of the auxiliary pole 116 is at least 1.8 T and does not exceed 2.0 T. As can be seen in FIG. 2, the auxiliary pole 116 may be desired to have its front edge at least a distance, d, from the back side of the pedestal 126. This separation may be desired to ensure that the auxiliary pole 116 and pedestal 126 are not magnetically connected near the ABS. In some embodiments, this distance is desired to be at least 0.2 micron. However, in other embodiments, the distance between the pedestal 126 back and the front of the auxiliary pole 116 is at least 0.5 micron.

Using the PMR transducer 110, performance of the PMR head 100 may be improved. To write to the media, a current is driven through the coil(s) 112A/112B. The auxiliary poles 114 and 116, as well as the main pole 120 are thus energized. Because of the configuration of the auxiliary poles 114 and 116, a higher field may be provided. More specifically, a greater amount of magnetic material in two auxiliary poles 114 and 116 allows for a higher field. Thus, a reduced field rise time may be achieved for the main pole 120. In addition, a smaller main pole tip 121 geometry may be achieved at this high field and lower rise time. Simultaneously, sufficient clearance between the two auxiliary poles 114 and 116 and the coils 112A/112B as well as between the auxiliary pole 116 and the pedestal 126 can be maintained. Thus, the configuration of the PMR transducer 110 allows for higher data rate recording at greater areal densities. Consequently, performance of the PMR head 100 may be improved.

Figure 3:
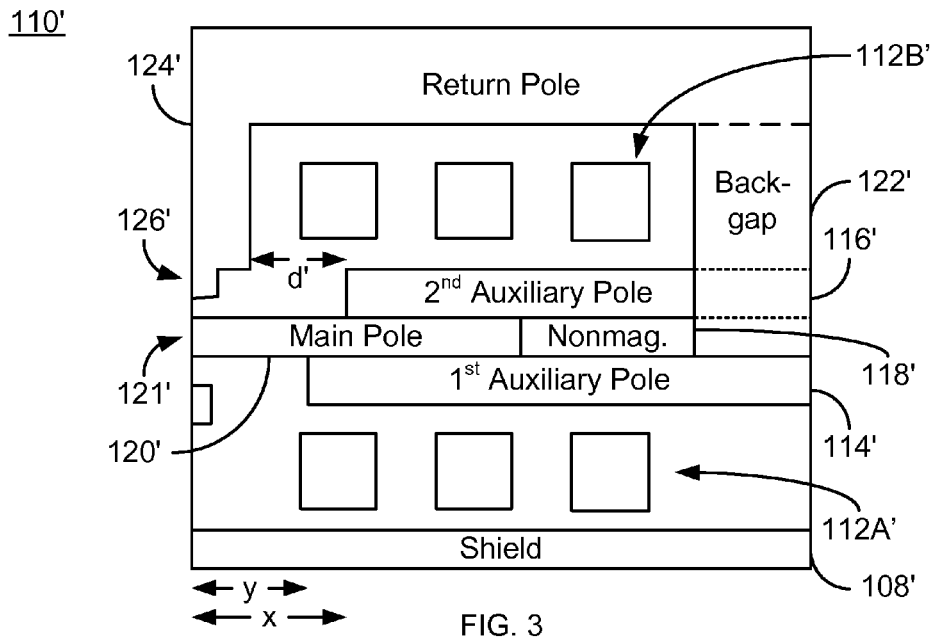
FIG. 3 is a diagram depicting a side view of another exemplary embodiment of a PMR transducer.

FIG. 3 depicts a side view of another exemplary embodiment of a PMR transducer 110'. For clarity, FIG. 3 is not to scale. Although FIG. 3 is described in the context of a PMR transducer, another type of transducer may be formed. For simplicity not all portions of the PMR transducer 110' are shown. In addition, although the PMR transducer 110' is depicted in the context of particular components other and/or different components may be used. Further, the arrangement of components may vary in different embodiments. The PMR transducer 110' has an ABS configured to reside close to a media (not shown) during operation. The PMR transducer 110' may be in a merged head including a read transducer and the PMR transducer 110' or may be in a separate write head. The PMR transducer 110' is analogous to the PMR transducer 110. Consequently, analogous portions have similar labels. The PMR transducer 110' thus includes the shield 108', coil(s) (including portions 112A' and 112B' shown), auxiliary poles 114' and 116', nonmagnetic spacer 118', main pole 120', backgap 122' and return pole 124' that are analogous to the shield 108, coil(s) (including portions 112A and 112B), auxiliary poles 114 and 116, nonmagnetic spacer 118, main pole 120, backgap 122 and return pole 124, respectively. In some embodiments, the PMR transducer 110' may have other magnetic components, such as a wraparound shield or side shields that are not shown.

The main pole 120' has a pole tip 121' that occupies a portion of the ABS. The pole tip 121' region of the main pole 120' may have an ABS-facing surface that has a top wider than the bottom. Further, although not shown, the main pole 120' may have top and/or bottom bevels such that the main pole 120' is taller distal from the ABS. However, in other embodiments, the main pole 120' may have other shapes. The main pole 120' extends distal from the ABS. In some embodiments, the back edge of the main pole 120' adjoins the nonmagnetic spacer 118'. The back portion of the main pole 120' overlaps the auxiliary poles 114' and 116.

The backgap 122' magnetically couples the back portions of the auxiliary poles 114' and 116' with each other and with the return pole 124'. In some embodiments, the return pole 124' and back gap 122' may be considered to act as a single entity and thus are separated by a dashed line. The return pole 124' also includes a pedestal 126'. The pedestal 126' is shown as having a notch near its back surface. However, in other embodiments, the pedestal 126' may have different shapes. The coil(s) 112A'/112B' shown are helical coils. However, in other embodiments, other coils including but not limited to pancake coils may be used.

The auxiliary poles 114' and 116' are both magnetically coupled with the main pole 120' and with the back gap 122'. The structure and function of the auxiliary poles 114' and 116' are analogous to the structure and function of the auxiliary poles 114 and 116, respectively. In some embodiments, the back portion of the auxiliary pole 116' overlaps the backgap 122' and thus is shown by dashed lines. The auxiliary poles 114' and 116' are recessed from the ABS and sandwich a portion of the main pole 120' and nonmagnetic spacer 118'. In the embodiment depicted in FIG. 3, the auxiliary pole 116' is further from the ABS than the auxiliary pole 114'. The auxiliary poles 114' and 116' are shown as having the same thickness and shape. However, in other embodiments, the auxiliary poles 114' and 116' may have different thicknesses and shapes. Further, the same or different material(s) may be used for the auxiliary poles 114' and 116'. The properties of these materials are analogous to those described above with respect to the PMR transducer 100. The auxiliary pole 116' may be desired to have its front edge at least a distance, d', from the back side of the pedestal 126'. This separation may be desired to ensure that the pole 116' and pedestal 126' are not magnetically connected near the ABS. This distance, d', is analogous to the distance, d, described above.

Using the PMR transducer 110', performance of the PMR head 100 may be improved. Despite the asymmetry in the auxiliary poles 114' and 116', a reduced field rise time and smaller pole tip 121' geometry may be achieved for the main pole 120'. Sufficient clearance between the two auxiliary poles 114' and 116' and the coils 112A'/112B' as well as between the auxiliary pole 116' and the pedestal 126' can be maintained. Thus, the configuration of the PMR transducer 110' allows for higher data rate recording at greater areal densities.

Figure 4:
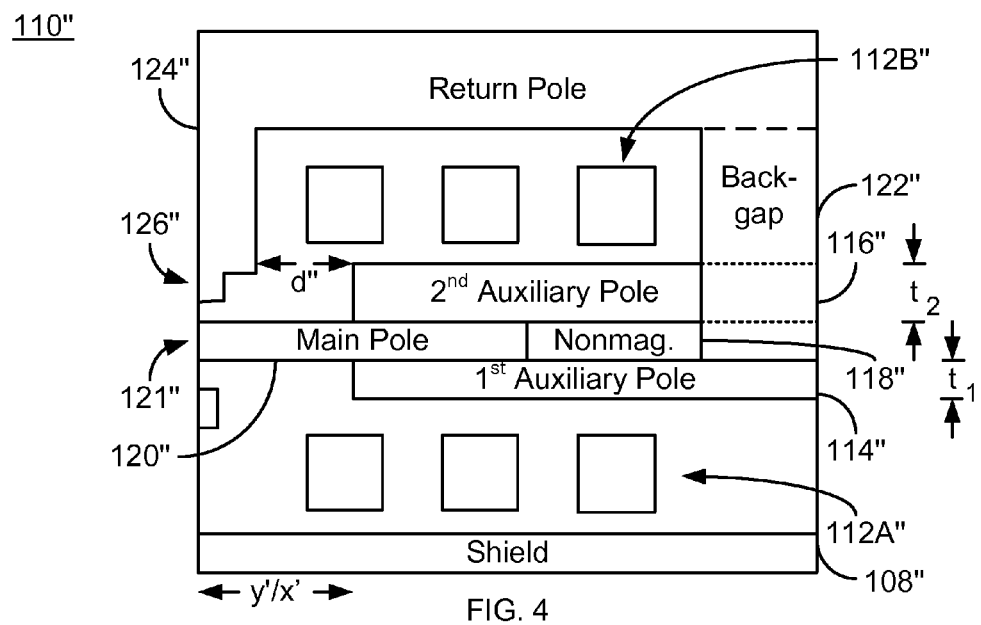
FIG. 4 is a diagram depicting a side view of another exemplary embodiment of a PMR transducer.

FIG. 4 depicts a side view of another exemplary embodiment of a PMR transducer 110". For clarity, FIG. 4 is not to scale. Although FIG. 4 is described in the context of a PMR transducer, another type of transducer may be formed. For simplicity not all portions of the PMR transducer 110" are shown. In addition, although the PMR transducer 110" is depicted in the context of particular components other and/or different components may be used. Further, the arrangement of components may vary in different embodiments. The PMR transducer 110" has an ABS configured to reside close to a media (not shown) during operation. The PMR transducer 110" may be in a merged head including a read transducer and the PMR transducer 110" or may be in a separate write head. The PMR transducer 110" is analogous to the PMR transducer 110. Consequently, analogous portions have similar labels. The PMR transducer 110" thus includes the shield 108", coil(s) (including portions 112A" and 112B" shown), auxiliary poles 114" and 116", nonmagnetic spacer 118", main pole 120", backgap 122" and return pole 124" that are analogous to the shield 108, coil(s) (including portions 112A and 112B), auxiliary poles 114 and 116, nonmagnetic spacer 118, main pole 120, backgap 122 and return pole 124, respectively. In some embodiments, the PMR transducer 110" may have other magnetic components, such as a wraparound shield or side shields that are not shown.

The main pole 120" has a pole tip 121" that occupies a portion of the ABS. The pole tip 121" region of the main pole 120" may have an ABS-facing surface that has a top wider than the bottom. Further, although not shown, the main pole 120" may have top and/or bottom bevels such that the main pole 120" is taller distal from the ABS. However, in other embodiments, the main pole 120" may have other shapes. The main pole 120" extends distal from the ABS. In some embodiments, the back edge of the main pole 120" adjoins the nonmagnetic spacer 118". The back portion of the main pole 120" overlaps the auxiliary poles 114" and 116".

The backgap 122" magnetically couples the back portions of the auxiliary poles 114" and 116" with each other and with the return pole 124". In some embodiments, the return pole 124" and back gap 122" may be considered to act as a single entity and thus are separated by a dashed line. The return pole 124" also includes a pedestal 126" having a notch near its back surface. However, in other embodiments, the pedestal 126" may have different shapes. The coil(s) 112A"/112B" are helical coils. However, in other embodiments, other coils including but not limited to pancake coils may be used.

The auxiliary poles 114" and 116" are both magnetically coupled with the main pole 120" and with the back gap 122". The structure and function of the auxiliary poles 114" and 116" are analogous to the structure and function of the auxiliary poles 114 and 116, respectively. In some embodiments, the back portion of the auxiliary pole 116" overlaps the backgap 122" and thus is shown by dashed lines. The auxiliary poles 114" and 116" are recessed from the ABS and sandwich a portion of the main pole 120" and nonmagnetic spacer 118". In the embodiment depicted in FIG. 4, the auxiliary pole 116" is thicker than the auxiliary pole 114". The auxiliary poles 114" and 116" are shown as having the same distance from the ABS, length, and shape. However, in other embodiments, the auxiliary poles 114" and 116" may have different distances from the ABS, lengths, and/or shapes. Further, the same or different material(s) may be used for the auxiliary poles 114" and 116". The properties of these materials are analogous to those described above with respect to the PMR transducer 100. The auxiliary pole 116" may be desired to have its front edge at least a distance, d", from the back side of the pedestal 126". This separation may be desired to ensure that the pole 116" and pedestal 126" are not magnetically connected near the ABS. This distance, d", is analogous to the distance, d, described above.

Using the PMR transducer 110", performance of the PMR head 100 may be improved. Despite the asymmetry in the auxiliary poles 114" and 116", a reduced field rise time and smaller pole tip 121" geometry may be achieved for the main pole 120". Sufficient clearance between the two auxiliary poles 114" and 116" and the coils 112A"/112B" as well as between the auxiliary pole 116" and the pedestal 126" can be maintained. Thus, the configuration of the PMR transducer 110" allows for higher data rate recording at greater areal densities.

Figure 5:
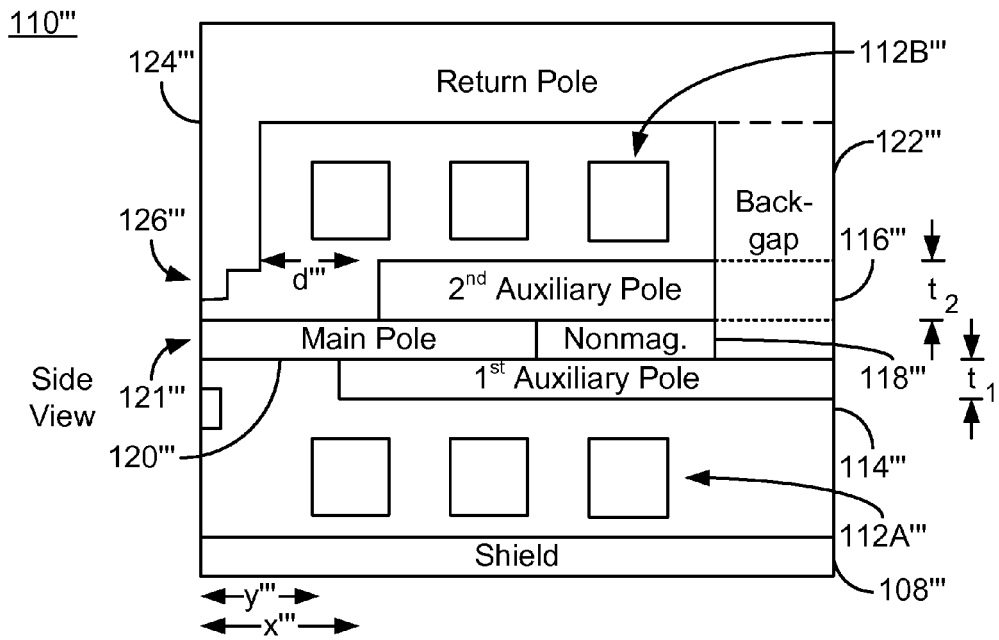
FIG. 5 is a diagram depicting a side view of another exemplary embodiment of a PMR transducer.

FIG. 5 depicts a side view of another exemplary embodiment of a PMR transducer 110'''. For clarity, FIG. 5 is not to scale. Although FIG. 5 is described in the context of a PMR transducer, another type of transducer may be formed. For simplicity not all portions of the PMR transducer 110''' are shown. In addition, although the PMR transducer 110''' is depicted in the context of particular components other and/or different components may be used. Further, the arrangement of components may vary in different embodiments. The PMR transducer 110''' has an ABS configured to reside close to a media (not shown) during operation. The PMR transducer 110''' may be in a merged head including a read transducer and the PMR transducer 110''' or may be in a separate write head. The PMR transducer 110''' is analogous to the PMR transducer 110. Consequently, analogous portions have similar labels. The PMR transducer 110''' thus includes the shield 108''', coil(s) (including portions 112A''' and 112B''' shown), auxiliary poles 114''' and 116''', nonmagnetic spacer 118''', main pole 120''', backgap 122''' and return pole 124''' that are analogous to the shield 108, coil(s) (including portions 112A and 112B), auxiliary poles 114 and 116, nonmagnetic spacer 118, main pole 120, backgap 122 and return pole 124, respectively. In some embodiments, the PMR transducer 110''' may have other magnetic components, such as a wraparound shield or side shields that are not shown.

The main pole 120''' has a pole tip 121''' that occupies a portion of the ABS. The pole tip 121''' region of the main pole 120''' may have an ABS-facing surface that has a top wider than the bottom. Further, although not shown, the main pole 120''' may have top and/or bottom bevels such that the main pole 120''' is taller distal from the ABS. However, in other embodiments, the main pole 120''' may have other shapes. The main pole 120''' extends distal from the ABS. In some embodiments, the back edge of the main pole 120''' adjoins the nonmagnetic spacer 118'''. The back portion of the main pole 120''' overlaps the auxiliary poles 114''' and 116'''.

The backgap 122''' magnetically couples the back portions of the auxiliary poles 114''' and 116''' with each other and with the return pole 124'''. In some embodiments, the return pole 124''' and back gap 122''' may be considered to act as a single entity and thus are separated by a dashed line. The return pole 124''' also includes a pedestal 126''' having a notch near its back surface. However, in other embodiments, the pedestal 126''' may have different shapes. The coil(s) 112A'''/112B''' are helical coils. However, in other embodiments, other coils including but not limited to pancake coils may be used.

The auxiliary poles 114''' and 116''' are both magnetically coupled with the main pole 120''' and with the back gap 122'''. The structure and function of the auxiliary poles 114''' and 116''' are analogous to the structure and function of the auxiliary poles 114 and 116, respectively. In some embodiments, the back portion of the auxiliary pole 116''' overlaps the backgap 122''' and thus is shown by dashed lines. The auxiliary poles 114''' and 116''' are recessed from the ABS and sandwich a portion of the main pole 120''' and nonmagnetic spacer 118'''. In the embodiment depicted in FIG. 5, the auxiliary pole 116''' is thicker than the auxiliary pole 114''' and a different distance from the ABS. The auxiliary poles 114''' and 116''' are shown as having the same shape. However, in other embodiments, the auxiliary poles 114''' and 116''' may have different shapes. Further, the same or different material(s) may be used for the auxiliary poles 114''' and 116'''. The properties of these materials are analogous to those described above with respect to the PMR transducer 100. The auxiliary pole 116''' may be desired to have its front edge at least a distance, d", from the back side of the pedestal 126'''. This separation may be desired to ensure that the pole 116''' and pedestal 126''' are not magnetically connected near the ABS. This distance, d", is analogous to the distance, d, described above.

Using the PMR transducer 110''', performance of the PMR head 100 may be improved. Despite the asymmetry in the auxiliary poles 114''' and 116''', a reduced field rise time and smaller pole tip 121''' geometry may be achieved for the main pole 120'''. Sufficient clearance between the two auxiliary poles 114''' and 116''' and the coils 112A'''/112B''' as well as between the auxiliary pole 116''' and the pedestal 126''' can be maintained. Thus, the configuration of the PMR transducer 110''' allows for higher data rate recording at greater areal densities.

Figure 6:
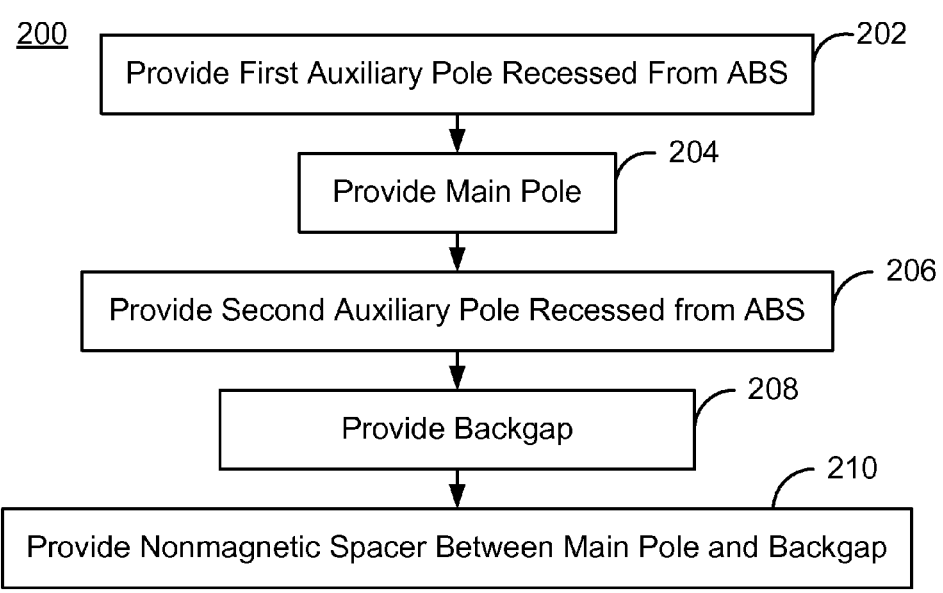
FIG. 6 is a flow chart depicting an exemplary embodiment of a method for fabricating a PMR transducer.

FIG. 6 depicts an exemplary embodiment of a method 200 of forming a portion of a PMR head. For simplicity, some steps may be omitted, combined, interleaved, and/or performed in another sequence. The method 200 is described in the context of the PMR head 100 and PMR transducer 110. However, the method 200 may be used to fabricate other PMR heads and other transducers such as the transducers 110', 110", and/or 110'''. In addition, the method 200 is described in the context of fabricating a single disk drive 100. However, multiple transducers may be fabricated substantially in parallel. Further, although described as separate steps, portions of the method 200 may be interleaved. Finally, the steps of the method 200 typically include multiple substeps.

The first auxiliary pole 114 is provided, via step 202. Step 202 may include depositing and patterning the auxiliary pole. The main pole 120 is provided, via step 204. The pole tip 121 may also be fabricated, for example by patterning the ABS region of the PMR transducer 110. The second auxiliary pole 116 is also provided, via step 206. Step 206 may include depositing and patterning the auxiliary pole 116. The backgap 122 is provided, via step 208. Thus, the magnetic materials coupling the poles 114, 116, and 124 are provided. The nonmagnetic spacer 118 is also provided, via step 210. The nonmagnetic spacer 118 may also be provided as part of formation of the main pole 204 and/or auxiliary poles 114 and 116. The remaining portions of the transducer 110 may then be provided.

Using the method 200, the PMR transducers 110, 110', 110", and 110''' may be obtained. Consequently, the benefits of such devices may be achieved.

We claim:

1. A magnetic recording head having an air-bearing surface (ABS) configured to reside in proximity to a media during use, the magnetic recording head comprising:
   a main pole including pole tip occupying a portion of the ABS and a back edge distal from the ABS;
   a first auxiliary pole having a first front recessed from the ABS and a first back portion, the first auxiliary pole being magnetically coupled with the main pole;
   a second auxiliary pole having a second front recessed from the ABS and a second back portion, a portion of the main pole distal from the ABS residing between the first auxiliary pole and the second auxiliary pole, the second auxiliary pole being magnetically coupled with the main pole;
   a backgap magnetically coupling the first back portion of the first auxiliary pole with the second back portion of the second auxiliary pole;
   a nonmagnetic spacer adjoining the back edge of the main pole and residing between the first auxiliary pole and the second auxiliary pole; and
   at least one coil for energizing the main pole.

2. The magnetic recording head of claim 1 wherein the main pole is a perpendicular magnetic recording pole.

3. The magnetic recording head of claim 1 wherein the first front of the first auxiliary pole is a first distance from the ABS, wherein the second front of the second auxiliary pole is a second distance from the ABS, and wherein the first distance is different from the second distance.

4. The magnetic recording head of claim 1 wherein the first auxiliary pole has a first thickness, wherein the second auxiliary pole has a second thickness, and wherein the first thickness is different from the second thickness.

5. The magnetic recording head of claim 1 wherein the first auxiliary pole includes at least a first magnetic material, wherein the second auxiliary pole at least a second magnetic material, and wherein the at least the first magnetic material is different from the at least the second magnetic material.

6. The magnetic recording head of claim 5 wherein the at least the first magnetic material has a first saturation magnetization, wherein the at least the second magnetic material has a second saturation magnetization, and wherein the first saturation magnetization is different from the second saturation magnetization.

7. The magnetic recording head of claim 1 wherein the at least one coil includes a helical coil.

8. The magnetic recording head of claim 1 further comprising:
   a return pole magnetically coupled with the first auxiliary pole and the second auxiliary pole through the backgap.

9. The magnetic recording head of claim 8 wherein the return pole includes a pedestal having a back surface, wherein the second auxiliary pole is closer to the return pole than the first auxiliary pole, and wherein the second auxiliary pole has a front edge at least 0.2 micron from the back surface of the pedestal.

10. The magnetic recording head of claim 9 wherein the front edge is at least 0.5 micron from the back surface of the pedestal.

11. The magnetic recording head of claim 1 wherein the nonmagnetic spacer resides between the back edge of the main pole and the backgap.

12. A perpendicular magnetic recording (PMR) head having an air-bearing surface (ABS) configured to reside in proximity to a media during use, the magnetic recording head comprising:
   a main pole including pole tip occupying a portion of the ABS and a back edge distal from the ABS;
   a first auxiliary pole having a first front recessed a first distance from the ABS, a first back portion, a first thickness, a first saturation magnetization of at least one and not more than 2.3 T, and being magnetically coupled with the main pole;
   a second auxiliary pole having a second front recessed a second distance from the ABS, a second back portion, a second thickness substantially equal to the first thickness, and a second saturation magnetization at least 1.8 and not more than 2 T, and being magnetically coupled with the main pole, a portion of the main pole distal from the ABS residing between the first auxiliary pole and the second auxiliary pole;
   a backgap magnetically coupling the first back portion of the first auxiliary pole with the second back portion of the second auxiliary pole;

a nonmagnetic spacer adjoining the back edge of the main pole, residing between the first auxiliary pole and the second auxiliary pole;
a return pole having a pedestal and magnetically coupled with the first auxiliary pole and the second auxiliary pole through the backgap, the pedestal having a back surface, the second front of the second auxiliary pole being at least 0.5 micron from the back surface of the pedestal;
at least one helical coil for energizing the main pole.

13. The PMR head of claim 12 wherein the nonmagnetic spacer resides between the back edge of the main pole and the backgap.

14. A magnetic recording disk drive comprising:
a slider;
a magnetic recording head coupled with the slider and including a main pole, a first auxiliary pole, a second auxiliary pole, a backgap, a nonmagnetic spacer, and at least one coil, the main pole including pole tip occupying a portion of the ABS and a back edge distal from the ABS, the first auxiliary pole having a first front recessed from the ABS, a first back portion, and being magnetically coupled with the main pole, the second auxiliary pole having a second front recessed from the ABS, a second back portion, and being magnetically coupled with the main pole, a portion of the main pole distal from the ABS residing between the first auxiliary pole and the second auxiliary pole, the backgap magnetically coupling the first back portion of the first auxiliary pole with the second back portion of the second auxiliary pole, the nonmagnetic spacer adjoining the back edge of the main pole and residing between the first auxiliary pole and the second auxiliary pole, the at least one coil for energizing the main pole.

15. A method for providing a magnetic recording head having an air-bearing surface (ABS) configured to reside in proximity to a media during use, the method comprising:
providing a main pole including pole tip occupying a portion of the ABS and a back edge distal from the ABS;
providing a first auxiliary pole having a first front recessed from the ABS and a first back portion, the first auxiliary pole being magnetically coupled with the main pole;
providing a second auxiliary pole having a second front recessed from the ABS and a second back portion, a portion of the main pole distal from the ABS residing between the first auxiliary pole and the second auxiliary pole, the second auxiliary pole being magnetically coupled with the main pole;
providing a backgap magnetically coupling the first back portion of the first auxiliary pole with the second back portion of the second auxiliary pole;
providing a nonmagnetic spacer adjoining the back edge of the main pole, residing between the first auxiliary pole and the second auxiliary pole; and
providing at least one coil for energizing the main pole.

16. The method of claim 15 wherein the main pole is a perpendicular magnetic recording pole.

* * * * *